(12) United States Patent
Chen et al.

(10) Patent No.: US 8,892,566 B2
(45) Date of Patent: Nov. 18, 2014

(54) CREATING INDEXES FOR DATABASES

(75) Inventors: Qi Chen, Hayward, CA (US); Hai Feng Li, Beijing (CN); Guang Zhou Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/073,377

(22) Filed: Mar. 28, 2011

(65) Prior Publication Data

US 2011/0246479 A1 Oct. 6, 2011

(30) Foreign Application Priority Data

Mar. 30, 2010 (CN) .......................... 2010 1 0136973

(51) Int. Cl.
*G06F 17/30* (2006.01)
(52) U.S. Cl.
CPC ................................ *G06F 17/30321* (2013.01)
USPC ........... 707/741; 707/715; 707/717; 707/714; 707/E17.002
(58) Field of Classification Search
CPC .......... G06F 17/30336; G06F 17/3002; G06F 17/30321; G06F 17/30938; G06F 17/30501; G06F 17/30466; G06F 17/30436
USPC ................................................. 707/705–780
See application file for complete search history.

(56) References Cited

U.S. PATENT DOCUMENTS

| 6,480,839 | B1 | 11/2002 | Whittington |
| 6,513,034 | B1 * | 1/2003 | Leung et al. .......................... 1/1 |
| 7,240,066 | B2 * | 7/2007 | Burchall et al. ....................... 1/1 |
| 7,272,598 | B2 * | 9/2007 | Cunningham et al. ................ 1/1 |
| 7,299,224 | B2 | 11/2007 | Doerre et al. |
| 8,065,308 | B2 * | 11/2011 | Shadmon et al. ............. 707/741 |
| 2004/0236727 | A1 | 11/2004 | Day et al. |
| 2005/0154710 | A1 | 7/2005 | Ruhlow et al. |
| 2006/0282420 | A1 * | 12/2006 | Santosuosso ..................... 707/4 |
| 2008/0183663 | A1 * | 7/2008 | Day et al. ......................... 707/2 |
| 2009/0182720 | A1 | 7/2009 | Cain et al. |
| 2009/0182724 | A1 | 7/2009 | Day et al. |
| 2010/0082671 | A1 * | 4/2010 | Li et al. ......................... 707/770 |
| 2011/0082854 | A1 * | 4/2011 | Eidson et al. ................. 707/714 |
| 2011/0119249 | A1 * | 5/2011 | Flatz et al. .................... 707/714 |

FOREIGN PATENT DOCUMENTS

| CN | 101082918 A | 12/2007 |
| CN | 101587484 A | 11/2009 |

* cited by examiner

*Primary Examiner* — Michelle Owyang
(74) *Attorney, Agent, or Firm* — Mohammed Kashef; Edell, Shapiro & Finnan, LLC

(57) ABSTRACT

An index is created for a database by selecting at least one column of a database table as a basis to create the index, generating at least one index of a tree structure according to the at least one column, where a pointer stored in a leaf node of the at least one index is null. In an example embodiment, a value to a pointer is stored in a leaf node according to an intermediate result in response to the intermediate result being generated, where the pointer stored in the leaf node points to a data page storing the intermediate result. The created index can be reused and the intermediate result can be effectively used, such that the efficiency of database operation is improved.

8 Claims, 4 Drawing Sheets

CREATING INDEXES FOR DATABASES

BACKGROUND

1. Technical Field

The invention relates to the field of databases, and in particular to creating indexes for databases.

2. Discussion of the Related Art

Along with the development of computer technology, the application of a database is more and more prevalent, and the capacity of databases is increasingly larger. In order to quickly query a database, existing database management systems create indexes for databases. Indexes are created on some columns in a database table. For example, an index can be created on columns such as: 1) columns that need to be searched frequently (to speed up searching); 2) columns that are used as a primary key (to enforce uniqueness of the column and organize arrangement structure of data in the table); 3) columns that are frequently used for a 'join' operation between tables (such columns can be foreign keys and may speed up 'join'); 4) columns that frequently need to be searched according to scope (the data in the designated scope is continuous since the index has been ordered); 5) columns that frequently need to be sorted (a query that requires sorting can utilize the order of indexes to speed up the query, since indexes have been sorted); and 6) columns that are frequently used in a WHERE clause to speed up computation of conditions in the where clause.

Creation of an index can greatly improve performance of a database system. Uniqueness of each row of data in a database table can be assured by creating a unique index, such that searching of data can be accelerated and a 'join' operation between tables can also be accelerated, specifically, it is particularly meaningful in realizing reference integration of data. When data is searched by using a group and order clause, the time of grouping and sorting in a query can also be significantly reduced. By utilizing an index, optimization may be used during the query, thereby improving performance of system.

In existing database management systems, a B+Tree index is the most common index structure, and an index created by default is such type of index. A B+Tree index is a type of balance tree and is based on a binary tree; it is composed of a root node, an intermediate node and a leaf node. Root nodes, intermediate nodes and leaf nodes are all located in an index page and are called as an index node. The node that does not have parent node is a root node, the node that does not have child node is a leaf node, and the node located between root node and leaf node is an intermediate node. A root node stores a pointer pointing to an intermediate node; an intermediate node is located between a root node and a leaf node and stores a pointer pointing to next level intermediate node or leaf node; and a leaf node stores a pointer pointing to a data page (i.e., a physical storage location of data).

A database query is often a multiple-stage query. Assume there are two tables, T1 and T2, in which T1 has two indexes: index T1_i1 on a first column col1 and an index T1_i2 on a second column col2, taking the following query for example:

select*from T1, T2 where T1.col1=T2.col1 and T1.col2>=60 and T1.col2<90

The database management system first scans index T1_i2 by using the condition T1.col2>=60 and T1.col2<90 to obtain an intermediate result, and the intermediate result is copied into memory or other temporary storage location. At this time, the intermediate result corresponds to content between 60 and 90 indexed by the col2 in T1. Then, the column col1 of the intermediate result is matched with the first column of table T2 to obtain a query result. At this time, since what is stored in leaf node of index T1_i1 on the first column col1 of T1 is a pointer pointing to a physical storage location of data in original table T1, and the intermediate result is copied to memory or other temporary storage location, the pointer in index T1_i1 will become invalid for the intermediate result. That is, the intermediate result cannot utilize index T1_i1, thus, a full table traverse has to be performed on the intermediate result. In a large enterprise application, the capacity of the intermediate result is often very large, such that a full table traverse on intermediate result will consume a large amount of computing resources.

BRIEF SUMMARY

In an example embodiment, a method of creating an index for a database comprises selecting at least one column of a database table to create an index; generating at least one index of a tree structure according to the at least one column, wherein a pointer stored in a leaf node of the at least one index is null.

In another example embodiment, the method of creating index for a database further comprises assigning a value to the pointer stored in the leaf node according to an intermediate result in response to the intermediate result being generated, wherein the pointer stored in the leaf node to which the value is assigned points to data page storing the intermediate result.

In another example embodiment, the method of creating index for a database further comprises resetting the pointer stored in the leaf node as null responsive to completion of operation that uses the intermediate result.

In another example embodiment, a computer system for creating an index for a database comprises a processor configured to select at least one column of a database table as basis of creating an index, and generate at least one index of a tree structure according to the at least one column, wherein a pointer stored in a leaf node of the at least one index is null.

In another example embodiment, the processor of the computer system is further configured to assign a value to the pointer stored in the leaf node according to an intermediate result in response to the intermediate result being generated, wherein the pointer stored in the leaf node to which the value is assigned points to a data page storing the intermediate result.

In another example embodiment, the processor of the computer system is further configured to reset the pointer stored in the leaf node as null responsive to completion of an operation that uses the intermediate result.

The generated index can be reused, and since the index can be used to perform operation on the intermediate result, efficiency of database operation is also significantly improved.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
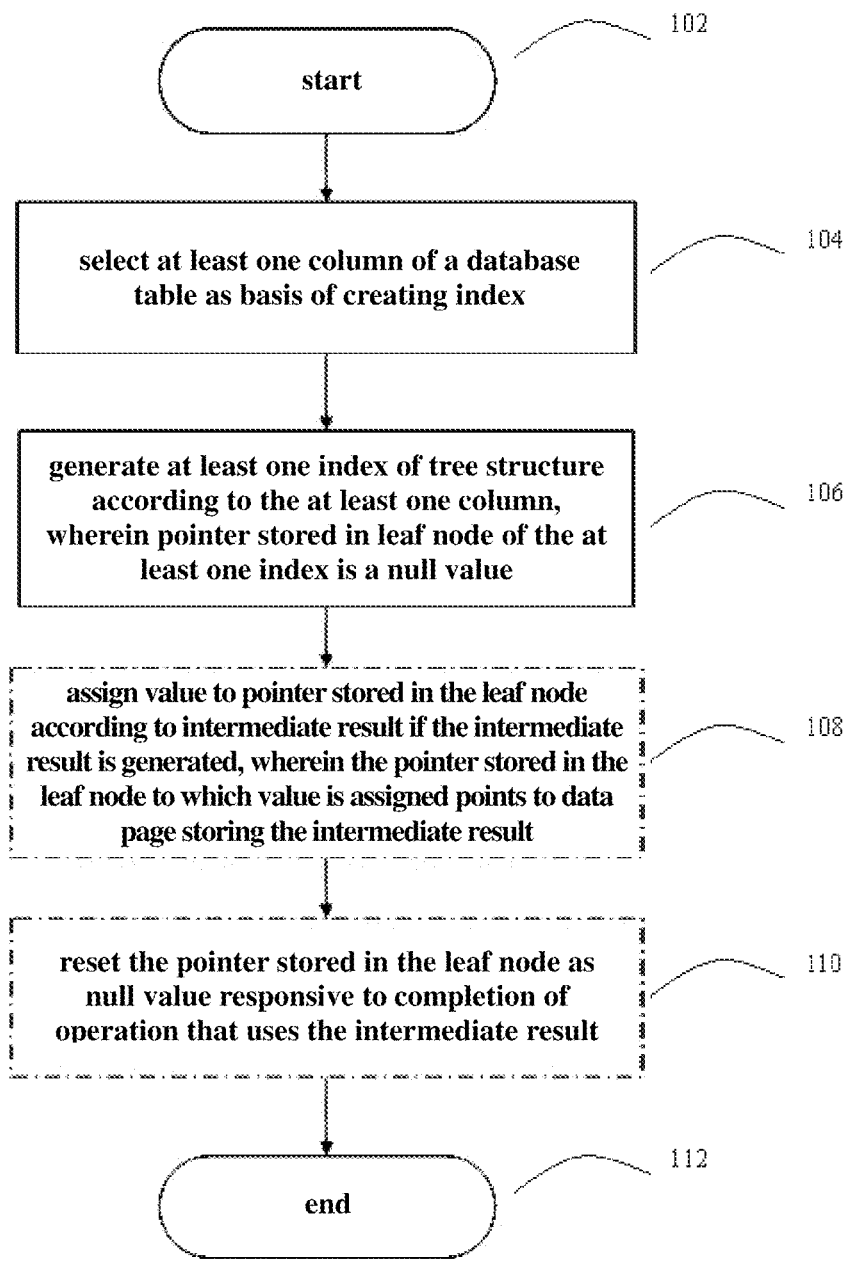
FIG. 1 shows a method of creating an index for database according to an example embodiment of the invention.

Example embodiments are described below in conjunction with the accompanying drawings. For clarity and simplicity, not all features of actual implementation are described in this specification. However, it will be appreciated that, during the development of any such actual embodiment, numerous implementation-specific decisions have to be made to achieve developers' specific goals, such as compliance with system-related and business-related constraints, which will vary from one implementation to another. Moreover, it should also be appreciated that, for those of ordinary skill in the art having the benefit of this disclosure, such development effort is merely a routine task.

Here, it should also be noted that, in order to avoid obscuring the invention with unnecessary details, only means or module structures and/or process steps that are closely associated with the solution of the invention are illustrated in the drawings, and other details that have little relationship therewith are omitted.

As previously noted, a B+Tree index is the most common index structure in a database management system. Hereinafter, the invention will be described by taking B+Tree for example; however, those skilled in the art will appreciate that other types of indexes having similar structures can also be applied in the invention, and taking B+Tree for example is merely for purposes of illustration and is in no way intended to limit the present invention.

The example embodiment of FIG. 1 describes a method 100 of creating an index for a database. As shown in FIG. 1, the method 100 of creating an index for a database starts at step 102. Next, the method 100 proceeds to step 104, in which one or more columns of a database table are selected as a basis of creating an index. These columns include: 1) columns that need to be searched frequently (e.g., to speed up searching); 2) columns that are used as a primary key (e.g., to enforce uniqueness of the column and organize arrangement structure of data in table); 3) columns that are frequently used for connection (e.g., these columns can be mainly foreign keys and may also speed up the connection); 4) columns that frequently needed to be searched according to scope (e.g., a designated scope can be continuous since the index has been ordered); 5) columns that frequently need to be ordered (e.g., a query can utilize an order of indexes to speed up query time of the order since indexes have been ordered); 6) columns that frequently use a WHERE sub-statement to speed up judgment speed of conditions; and so on. Then, the method 100 proceeds to step 106, in which a root node, an intermediate node and a leaf node of the index are generated according to the one or more columns, wherein a pointer stored in the leaf node is null.

The procedure of generating a root node, an intermediate node and a leaf node of the index is now described with a simple example with reference to FIGS. 2a-2d. It is to be noted that this is merely an illustrative description, and any other manner in the art may also be used in addition to the manner of generating a root node, an intermediate node and a leaf node of an index as described herein.

Assume that the selected column has the following values: 40, 59, 60, 66, 70, 72, 73, 75, 76, 78, 80, 83, 86, 90, . . . .

Figure 2A:
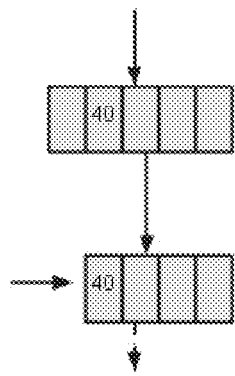
FIGS. 2a-2d illustratively show an example process of generating a root node, an intermediate node and a leaf node of an index.

First, the first value 40 is inserted to generate a root node, then a child node of the root node is generated. In the child node, the value 40 is an entry therein, as shown in FIG. 2a.

Figure 2B:
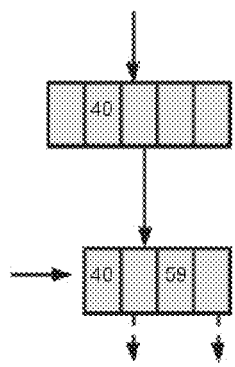

Then, the subsequent value 59 is continually inserted. The number of entries that can be stored in each child node is limited, here assume the number is M (M is a predefined value). At this time, it is first judged whether the number of entries stored in the child node will exceed M if the value 59 is inserted in that child node. In this example, the number of entries stored in the child node will not exceed M if the value 59 is inserted, thus it is inserted into the child node directly, as shown in FIG. 2b.

Figure 2C:
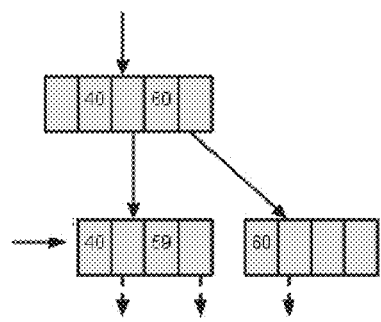

Then, the subsequent value 60 is continually inserted. At this time, a first judgment is made whether the number of entries stored in the child node will exceed M if the value 60 is inserted in the child node. In this example, the number of entries stored in the child node will exceed M if the value 60 is inserted. At this time, the child node needs to be divided into two nodes containing M/2 entries. Specifically, a new node is created, and values of the latter half of the original node are copied to the newly created node. An address of the newly created node and the minimum value contained therein are written into its parent node, as shown in FIG. 2c.

Figure 2D:
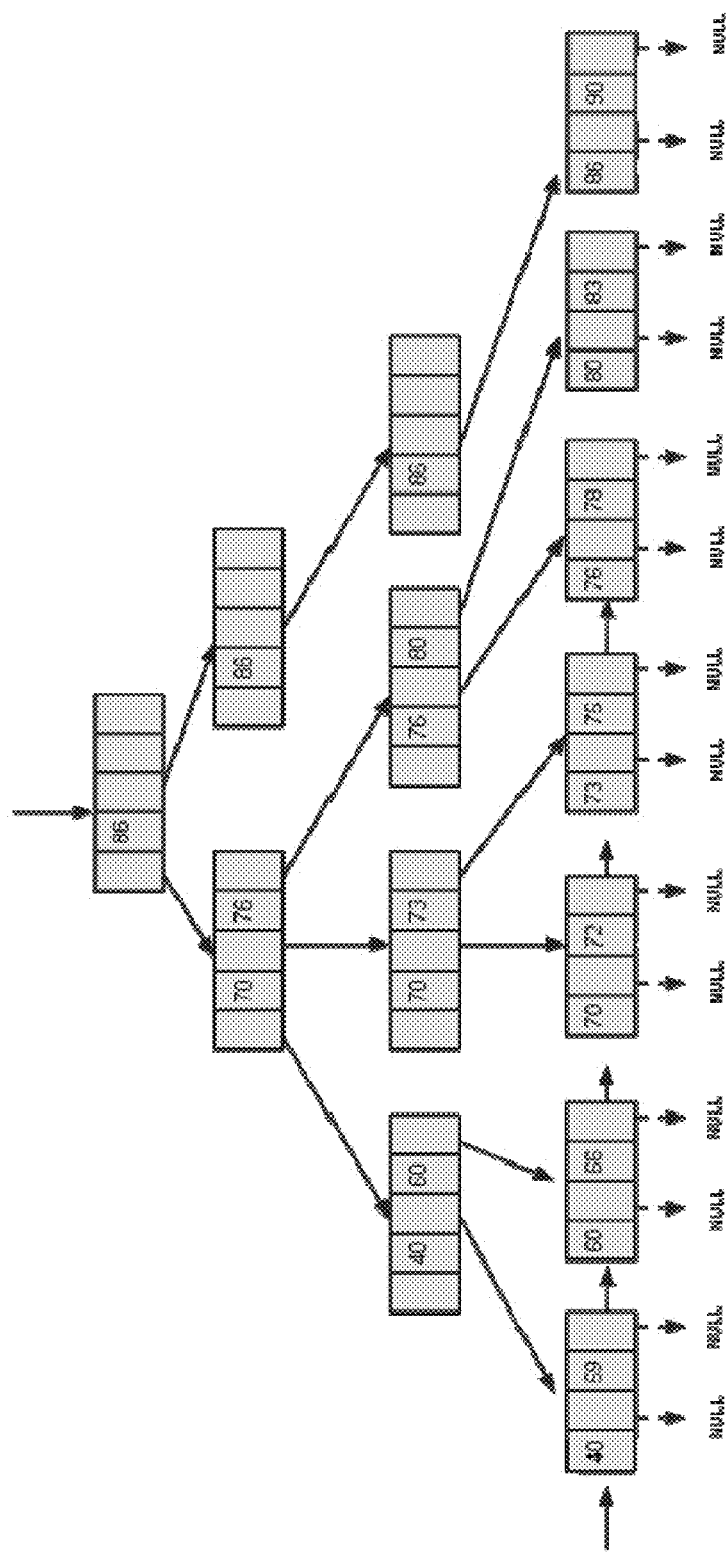

Thereafter, a subsequent value is continually inserted. If during insertion, after a child node is divided and the minimum value contained in the newly created node is written into its parent node, the number of entries of its parent node will also exceed M, then the parent node will be divided in a similar way until there is no node that needs to be divided. If a root node needs to be divided, then a node needs to be added as new root node of this root node (this root node will be a child node of the new root node). The structure of indexes after inserting all values is shown in FIG. 2d.

The procedure of generating a root node, an intermediate node and a leaf node of an index is illustratively described above. Again, it is noted that the above description is merely illustrative, and any other manner may be employed to generate a root node, an intermediate node and a leaf node of an index.

According to an example embodiment of the present invention, a pointer stored in the generated leaf node of an index is null, and the method 100 of creating an index for a database ends in accordance with this embodiment.

FIG. 1 also shows an optional step 108. In step 108, if an intermediate result is generated, then a value is assigned to a pointer stored in a leaf node according to the intermediate result, where the pointer stored in the leaf node to which the value is assigned points to data page storing the intermediate result. The database management system will copy the obtained intermediate result into memory or other temporary storage location when querying the database. At this time, if the intermediate result is generated, then a value is assigned to a pointer stored in a leaf node according to the intermediate result, where the pointer stored in the leaf node to which a value is assigned points to a data page storing the intermediate result, i.e., a physical storage location of the intermediate result, specifically, it may be memory or other temporary storage location storing the intermediate result. In particular, a column involved in a subsequent operation that needs to use the intermediate result is determined from the at least one column that is the basis of creating an index, and a value is assigned to the pointer stored in the leaf node of the index corresponding to the determined column according to the intermediate result.

In a query in which table T1 has two indexes, e.g., index T1_i1 on first column col1 and index T1_i2 on second column col2:

select*from T1, T2 where T1.col1=T2.col1 and T1.col2>=60 and T1.col2<90

According to an example embodiment of the invention, the database management system first creates two indexes for table T1: index T1_i1' corresponding to the first column col1 and index T1_i2' corresponding to the second column col2. When the above query is conducted, the database management system can first scan index T1_i2 on second column col2 according to condition T1.col2>=60 and T1.col2<90 to obtain the intermediate result, and copy the intermediate result into memory or other temporary storage location. At this time, the intermediate result corresponds to content of lines 60-90 indexed by the second column in T1. According to an example embodiment of the invention, a column involved in a subsequent operation that needs to use the intermediate result is first determined from the at least one column that is the basis of creating the index. In this query, columns that are the basis of creating the index are first column col1 and second column col2; and the database management system needs to use the first column of the intermediate result to match with the first column of table T2, thereby obtaining the query result. That is, the column involved in a subsequent operation that needs to use the intermediate result is the first column. Then, a value is assigned to a pointer stored in leaf node of index corresponding to the determined column according to the intermediate result. For this query, a value is assigned to a pointer stored in a leaf node of index T1_i1' corresponding to first column col1. At this time, the pointer stored in the leaf node to which the value is assigned points to a data page storing the intermediate result, that is, a physical storage location of the intermediate result (the content of lines 60-90 indexed by second column in T1) in memory or other temporary location. After the above assignment of the value, the pointer stored in the leaf node of index that is created according to the above method points to a data page storing the intermediate result, thus subsequent operation can be performed on the intermediate result by using the index to which the value has been assigned.

In other database management operations, for an intermediate result, the index that has already existed will become invalid. In contrast, in accordance with the present invention, after the value is assigned to a pointer stored in a leaf node of the created index, it points to a data page storing the intermediate result. Thus, the intermediate result is available for subsequent operation, thereby significantly improving performance of data query.

FIG. 1 also shows an optional step 110. In step 110, the pointer stored in the leaf node is reset as null responsive to completion of the operation that uses the intermediate result. These operations include operations such as join, filter, order by or group by. After the above operations are completed using the intermediate result with index created according to the method of the disclosure, the pointer stored in the leaf node is reset as null. Thereafter, if an intermediate result is generated again, a value may again be assigned to a pointer stored in the leaf node in which the pointer has been reset according to the intermediate result, that is, the index may be reused.

Figure 3:
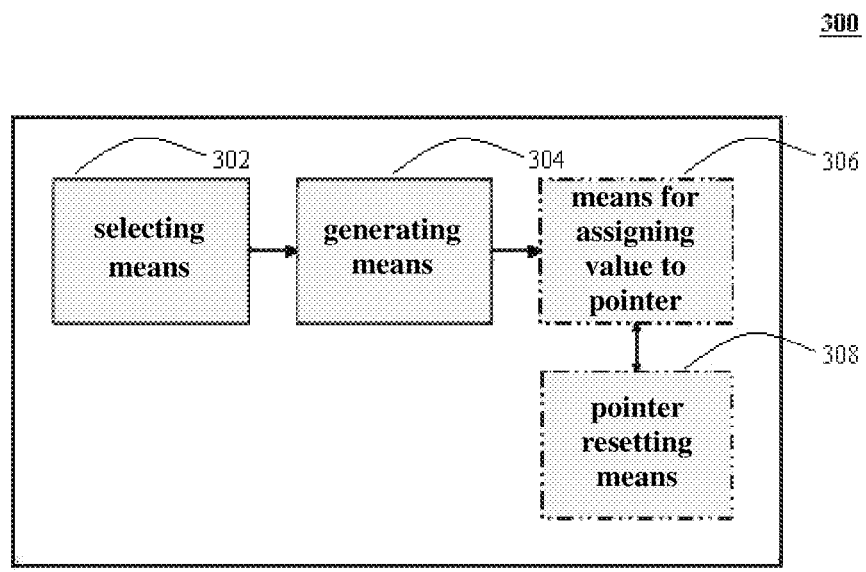
FIG. 3 shows a computer system for creating an index for a database according to an example embodiment of the invention.

Now referring to FIG. 3, a computer system 300 is described for creating an index for a database according to an example embodiment of the present invention. As shown in FIG. 3, the computer system 300 comprises a selecting module or selecting means 302 configured to select one or more columns of a database table as a basis of creating an index; a generating module or generating means 304 configured to generate a root node, an intermediate node and a leaf node of the index according to the one or more columns, where a pointer stored in a leaf node is null. FIG. 3 also shows an optional module or means: a module or means configured to assign a value to a pointer 306 stored in the leaf node according to an intermediate result in response to the intermediate result being generated, where the pointer stored in the leaf node to which value is assigned points to a data page storing the intermediate result. Preferably, the pointer is only inserted in the leaf node corresponding to the intermediate result. The computer system 300 of FIG. 3 also optionally includes a pointer resetting module or means 308 configured to reset the pointer stored in the leaf node as null responsive to completion of operation that uses the intermediate result, where the operations include join, filter, order by or group by. The computer system 300 can further include a processor that is configured to perform the operations of each of the module or means as described above and depicted in FIG. 3.

The basic principle of the disclosure has been described above in conjunction with specific embodiments; however, it should be noted that, those skilled in the art can appreciated that all or any step or means of the methods and apparatuses of the disclosure may be implemented in any computing means (including processor, storage medium etc) or network of computer means in hardware, firmware, software, or combination thereof, and this can be achieved by those skilled in the art using their basic programming skill after reading the description of the disclosure.

Thus, the object of the disclosure may also be implemented by running a program or a set of programs on any computing means. The computing means may be known general purpose means. Thus, the object of the disclosure may also be implemented by merely providing program product which contains program codes for implementing the method or apparatus. That is, such program product also constitutes the disclosure, and storage medium in which such program product is stored will also constitute the disclosure. Obviously, the storage medium may be any known storage medium or any storage medium that will be developed in future.

It should also be noted that, in the apparatus and method of the disclosure, obviously, each means or step may be decomposed and/or recombined. Such decomposition and/or recombination should be viewed as equivalent solution of the disclosure. Further, steps for performing the above series of processes may be performed according the mentioned order naturally in time sequence, but not necessarily in time sequence. Some steps may be performed in parallel or independent to each other.

Although the disclosure and its advantages have been described in detail, it should be appreciated that various modifications, replacements and changes may be made without departing from the spirit and scope of the disclosure defined by the appended claims. Further, terms "include", "contain" in the present application or any other variants are intended to encompass non-exclusive inclusion, such that process, method, article of manufacture or apparatus containing a series of elements include not only those elements, but also other elements not listed explicitly, or include elements inherent to such process, method, article of manufacture or apparatus. Without further limitation, element defined by phrase "including a . . . " does not exclude other same elements that exist in the process, method, article of manufacture or apparatus containing that element.

What is claimed:

1. A computer-implemented method of creating an index for a database, the method comprising:
   generating, via a processor, a first index as a tree structure utilizing a first column of a database table, wherein a pointer stored in a leaf node of the first index is initialized as null as part of the generating; and in response to receiving a query for data associated with a plurality of columns and a plurality of different indexes:

generating, via the processor, an intermediate result for the query, wherein the intermediate result is obtained by utilizing a second index associated with a second column of the database table; and assigning, via the processor, a value to the pointer stored in the leaf node, wherein the pointer points to a data page storing the intermediate result, and wherein the generating the first index is performed prior to receiving the query.

2. The computer-implemented method of claim 1, further comprising:

utilizing the first index in a subsequent operation associated with the response to the query, wherein the subsequent operation uses the intermediate result.

3. The computer-implemented method of claim 1, further comprising:

resetting the pointer stored in the leaf node as null responsive to completion of an operation that uses the intermediate result.

4. The computer-implemented method of claim 3, wherein:

the operation comprises at least one of join, filter, order by and group by.

5. A computer system for creating an index for a database, the computer system comprising a processor configured to:

generate a first index as a tree structure utilizing a first column of a database table, wherein a pointer stored in a leaf node of the first index is initialized as null as part of the generating; and in response to receiving a query for data associated with a plurality of columns and a plurality of different indexes:

generate an intermediate result for the query, wherein the intermediate result is obtained by utilizing a second index associated with a second column of the database table; and assign a value to the pointer stored in the leaf node, wherein the pointer points to a data page storing the intermediate result, and wherein the generating the first index is performed prior to receiving the query.

6. The computer system of claim 5, wherein the processor is further configured to:

utilize the first index in a subsequent operation associated with the response to the query, wherein the subsequent operation uses the intermediate result.

7. The computer system of claim 5, wherein the processor is further configured to:

reset the pointer stored in the leaf node as null responsive to completion of an operation that uses the intermediate result.

8. The computer system of claim 7, wherein the operation comprises at least one of join, filter, order by and group by.

* * * * *